(12) United States Patent
O'Connor

(10) Patent No.: US 6,377,303 B2
(45) Date of Patent: *Apr. 23, 2002

(54) STROBE COMPATIBLE DIGITAL IMAGE SENSOR WITH LOW DEVICE COUNT PER PIXEL ANALOG-TO-DIGITAL CONVERSION

(75) Inventor: Dennis M. O'Connor, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,161

(22) Filed: Nov. 26, 1997

(51) Int. Cl.[7] .......................... H04N 3/14; H04N 5/335; H03M 1/12
(52) U.S. Cl. ........................ 348/308; 348/302; 341/155
(58) Field of Search ................................ 348/296, 301, 348/308; 250/214 A, 214 R; 257/272; 356/218; 327/78; 341/155

(56) References Cited

U.S. PATENT DOCUMENTS

| 4,686,391 A | * | 8/1987 | Gudaitis | 327/78 |
|---|---|---|---|---|
| 4,710,817 A | * | 12/1987 | Ando | 348/241 |
| 4,924,081 A | * | 5/1990 | Arima et al. | 250/214 R |
| 5,373,295 A | * | 12/1994 | Michan | 341/155 |
| 5,461,425 A | * | 10/1995 | Fowler et al. | 348/294 |
| 5,469,091 A | * | 11/1995 | Takahashi et al. | 327/78 |
| 5,479,208 A | * | 12/1995 | Okumura | 348/301 |
| 5,512,950 A | * | 4/1996 | Watanabe et al. | 348/296 |
| 5,565,915 A | * | 10/1996 | Kindo et al. | 348/308 |
| 5,665,959 A | * | 9/1997 | Fossum et al. | 250/208.1 |
| 5,748,303 A | * | 5/1998 | Korta et al. | 250/214 R |
| 5,793,422 A | * | 8/1998 | Mochizuki et al. | 348/296 |
| 5,914,484 A | * | 6/1999 | Tawakayama et al. | 250/214 R |
| 5,920,274 A | * | 7/1999 | Gowda et al. | 341/155 |

* cited by examiner

Primary Examiner—Wendy R. Garber
Assistant Examiner—Rashawn N. Tillery
(74) Attorney, Agent, or Firm—Blakely, Sokoloff, Taylor & Zafman LLP

(57) ABSTRACT

A method having the steps of accumulating charge in a photo sensor to arrive at a photo sensor voltage; incrementing a value in a counter; generating a reference voltage based on the value in the counter; determining whether the photo sensor voltage is greater than the reference voltage; and, if the photo sensor voltage is greater than the reference voltage, then loading a memory with the value in the counter. An apparatus having a photo sensor; a comparator coupled to the photo sensor; a switching element coupled to the photo sensor; an AND-gate coupled to the comparator; and, a memory coupled to the AND-gate.

13 Claims, 3 Drawing Sheets

STROBE COMPATIBLE DIGITAL IMAGE SENSOR WITH LOW DEVICE COUNT PER PIXEL ANALOG-TO-DIGITAL CONVERSION

BACKGROUND

1. Field of the Invention

The present invention relates to the field of use of digital image capturing. More particularly, the present invention relates to image sensors with built-in analog-to-digital converters.

2. Description of Related Art

Typically, imaging sensor arrays have separate analog-to-digital (A/D) circuits which are located off of the array to digitize the captured pixels. The array is composed of a grid of pixel sensors, each pixel sensor generating a charge when the pixel sensor is exposed to a light source to which it is directed.

During operation, the array first captures the image by having each pixel sensor generating and storing an amount of charge corresponding to the amount of light it is exposed to. Then, the array sends the charge stored in each pixel sensor to the A/D circuit over an analog transfer circuit. The A/D circuit then produces a digital representation of the amount of charge received from the pixel sensor.

As the A/D circuit is often located some distance away from the array, the length of the analog lines which are used to send the analog pixel data between the array and the A/D circuit are quite long. As the length of the analog lines is increased, noise and power effects must be taken into consideration to avoid the loss or degradation of the captured signals.

Due to noise considerations, the number of analog lines used to transfer pixel signals from the array to the A/D circuit may be limited to avoid cross-talk or any of the other problems which are caused by interference between these signal lines. Additionally, if multiple independent A/D circuits are used, mismatches between them can cause undesirable artifacts in the resulting image. Therefore, the pixels in an array are typically digitized by transferring each pixel's charge sequentially to a single A/D circuit. In color sensors, where the array may be considered to consist of several sub-arrays each corresponding to a particular color channel, each color channel may have a single A/D circuit.

It would be desirable to eliminate the difficulties involved in accurately transferring the accumulated charge in each pixel to the A/D circuit. It would also sometimes be desirable to perform some amount of highly-parallel digital processing on the captured image before outputting it from the sensor—also known as digital focal-plane processing. It would be desirable to do both of these things correctly when the scene is illuminated by a photographic strobe, as is usually the case for indoor still photography.

Photographic strobes use a brief arc of electric current to provide a very intense burst of light that lasts for a very brief period of time. The intensity of the burst is not uniform over its duration. Photographic strobes are compact, light-weight and efficient, and allow accurate capture of the color of the object being illuminated.

One method of accomplishing accurate transfers and parallel pixel on-sensor processing would be to perform the analog to digital conversion within the circuitry of each pixel. However, to accomplish A/D conversion within the circuit of each pixel would require each pixel to have its own A/D circuit and building a conventional A/D circuit within each pixel is expensive.

One alternative approach is to implement a very simple A/D circuit that output only one or more bits. By using a technique known as over-sampling, a circuit can approximate a higher precision conversion under certain conditions. However, these conditions are not met when exposure times are effectively very short, for example, only a few multiples of the A/D conversion period, such as when a photographic strobe is used.

The techniques described above measures the charge level on the pixels after they have been exposed for a given period of time, and typically this measurement is done after the exposure has ended. Another approach is to measure, during the exposure, how long each pixel takes to reach a particular level of charge. In this approach, an analog circuit in each pixel constantly compares the charge level to a reference, and when the charge level reaches the reference point, a signal is generated which latches the current exposure time into a register associated with the pixel. This works well if the level of illumination if constant over the image capture interval, and if the image capture interval is many hundreds of clock cycles. However, when photographic strobes are used, these criteria for proper operation are not met.

SUMMARY

A system that works with photographic strobes involves having an apparatus having a photo sensor; a comparator coupled to the photo sensor; a switching element coupled to the photo sensor; an AND-gate coupled to the comparator; and, a memory coupled to the AND-gate. In this system, a method is used which has the steps of accumulating charge in a photo sensor to arrive at a photo sensor voltage; incrementing a value in a counter; generating a reference voltage based on the value in the counter; determining whether the photo sensor voltage is greater than the reference voltage; and, if the photo sensor voltage is greater than the reference voltage, then loading a memory with the value in the counter.

DETAILED DESCRIPTION

To digitize all pixels of a sensor array simultaneously in a manner that provides compatibility with photographic strobes, a system is provided which will allow each photo sensor in the sensor array to generate a digital value from the analog charge stored in the photo sensor. Each pixel of an image captured by the sensor array will be processed by a dedicated pixel capture circuit. The system will be scalable to provide as many pixels to be captured simultaneous in the sensor array as desired in an implementation, thereby allowing the creation of image capturing devices with a high-degree of resolution.

Figure 1:
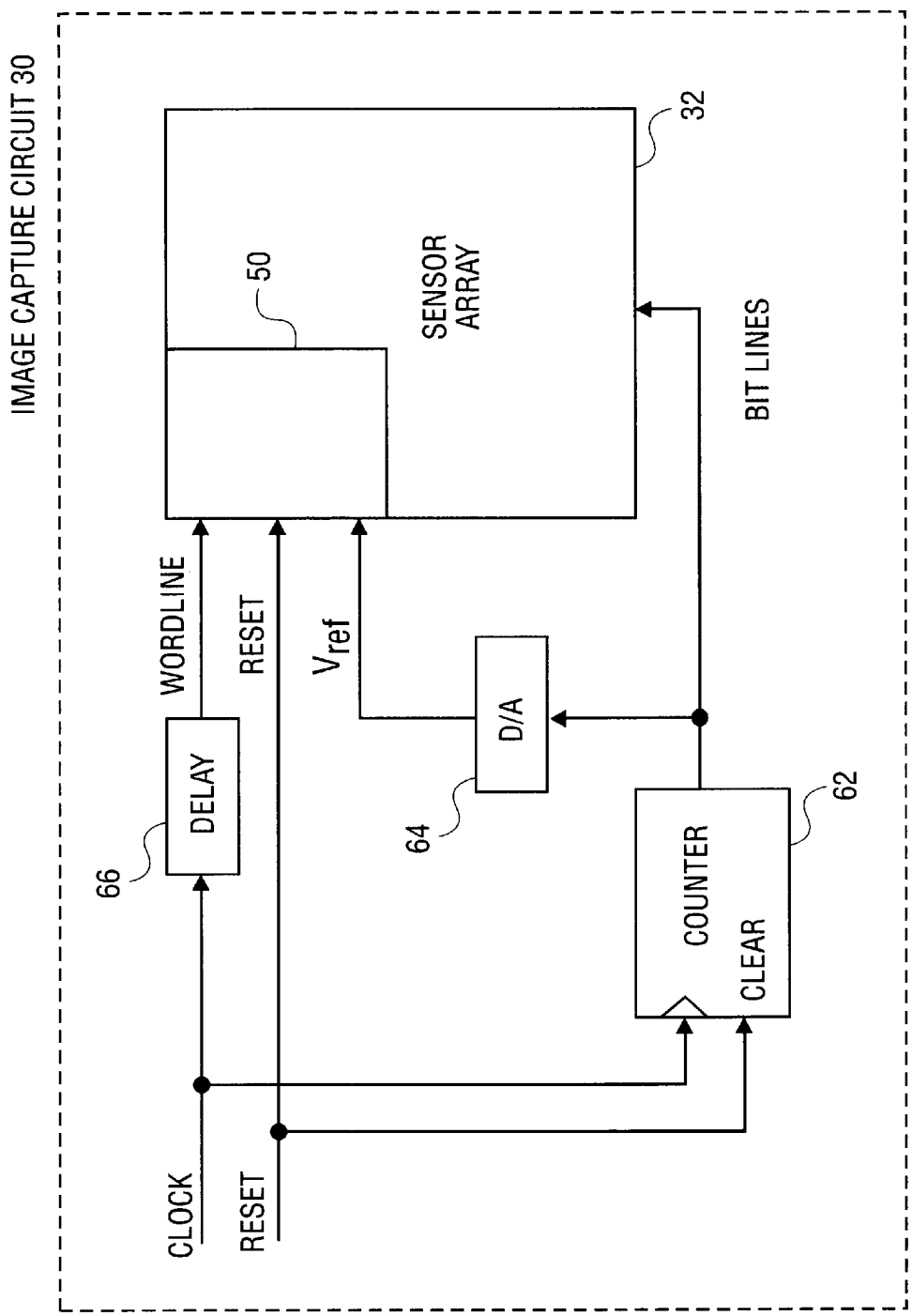
FIG. 1 is a block diagram of an image capture circuit configured in accordance with one preferred embodiment of the present invention.

FIG. 1 is a diagram of an image capture circuit 30 containing an image sensor 32 having a plurality of pixel capture circuits 50 which are configured in accordance with a preferred embodiment of the present invention. Coupled to pixel capture circuit 50 is a counter 62, a digital-to-analog circuit 64, and a delay circuit 66.

Pixel capture circuit 50 is representative of all the other pixel capture circuits (not shown) in image sensor 32. What is described for pixel capture circuit 50 applies to all the pixel capture circuits contained in image sensor 30. For example, the control signals described below as being provided to pixel capture circuit 50 is provided to all the other pixel capture circuits in image sensor 32.

Image capture circuit 30 is contained in a digital imaging device, such as a camera or an image scanner. In a preferred embodiment, image capture circuit 30 receives as inputs, a RESET signal and a CLOCK (CLK) signal which control the analog to digital conversion.

For output, the converted values stored in the sensor array may be read out in the same manner used for conventional DRAM arrays. For example, an address is provided which is decoded to drive a particular WordLine, which selects a particular pixel or a set of pixels. The selected pixel or set of pixels then outputs the value stored within the pixel or pixels to bit lines that are arranged throughout the sensor array.

Not shown in FIG. 1 are the circuits needed to drive individual word lines in response to an address, as would be necessary for read, write or refresh operations on the digital data stored in the DRAM cells. This would consist of an address decoder with an output enable, the output of which would be logically-OR'd with the WordLine signal that is the output of delay 66. Also not shown are the sense-amps, bit line drivers and other control circuits used for reading, writing and refreshing the DRAM cells. The method of incorporating these elements into the preferred embodiment is obvious to one skilled in the art.

Figure 2:
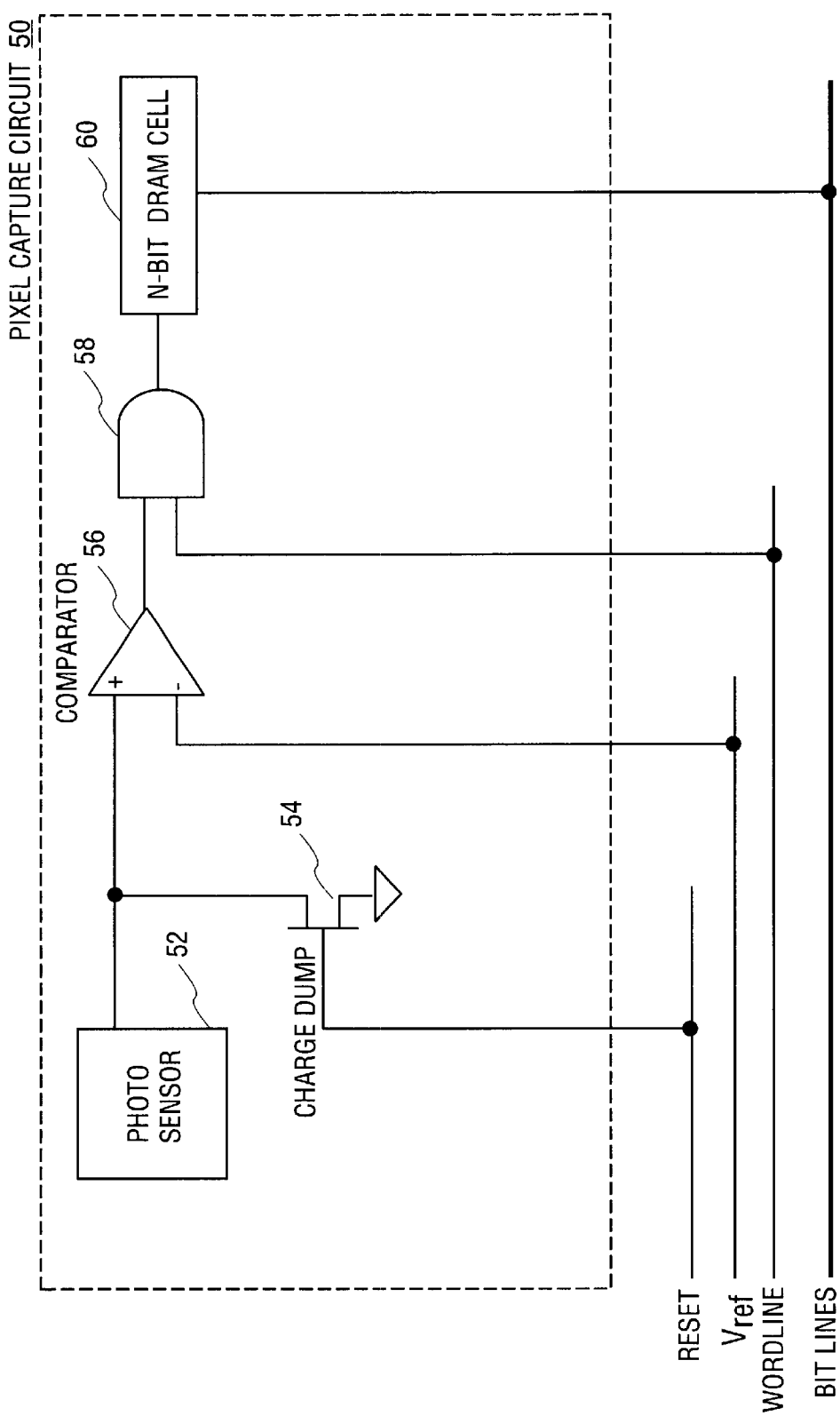
FIG. 2 illustrates a pixel capture circuit, which is contained in the image capture circuit, configured in accordance with one preferred embodiment of the present invention.

FIG. 2 is a block diagram of pixel capture circuit 50, which includes a photo sensor 52, a charge dump transistor 54, a comparator 56, an AND gate 58, and a N-bit dynamic random access memory (DRAM) cell 60. Comparator 56, AND gate 58 and N-bit DRAM cell 60 form the in-pixel elements of the analog-to-digital (A/D) converter. Coupled to the bit lines of N-bit DRAM cell 60 is the output of counter 62. Also, coupled to the input of comparator 56 is the output of D/A circuit 64. Lastly, coupled to the input of AND gate 58 is the output of delay circuit 66.

Photo sensor 52 is made up of a photoelectric device and a storage capacitor. Typically, this is a photo diode and its intrinsic capacitance. In one preferred embodiment, this is a CMOS sensor.

Charge dump transistor 54 is coupled to photo sensor 52 to allow the draining and resetting of the charge contained in photo sensor 52. Charge dump transistor 54, as shown, effectively grounds photo sensor 52 when it receives a signal on a Reset Array signal line which is connected to charge dump transistor 54. Alternatively, charge dump transistor 54 could be connected to a fixed voltage source such as the power supply. In the former case, photons cause charge to accumulate on a storage capacitor of photo sensor 52. In the latter, photons cause charge to leak from the storage capacitor. Either configuration can be used with this invention without altering any other circuits, though the interpretation of the resulting digital value (for example, whether a "0" represents a dark area or a bright one) may change as a result. In one preferred embodiment, charge dump transistor 54 is a switching device.

Comparator 56 receives the output of photo sensor 52 and is used in the determination of the digital representation of the charge stored in photo sensor 52. In one preferred embodiment, comparator 56 is a voltage comparitor which will compare the voltage at the output of photo sensor 52 and the reference voltage $V_{ref}$ which is generated by D/A circuit 64, as described below.

During digitization, AND gate 58 is used to control when N-bit DRAM cell 60 is to load a new value from the output of counter 62. AND gate 58 takes as input the output of comparator 56 and a WordLine signal and performs a logical-AND operation. The output of AND gate 58 will be sent to the LOAD input of N-bit DRAM cell 60. When comparator 56 and the WordLine are both logical ones, then AND gate 58 will output a logical one, which will cause N-bit DRAM cell 60 to connect its bit cells to the bit lines. Since during digitization the bit lines are being driven with the current value of counter 62, this will load the value which is output from counter 62 into N-bit DRAM cell 60. Note that when digitization is not in progress, the output of AND gate 58 may be used to control the reading and writing of DRAM cell 60. To accomplish this, the output of comparator 56 must be a logical 1. This can be accomplished in the circuit shown by presenting a sufficiently low voltage (one lower than the lowest possible output of the photosensor) on Vref. In another embodiment, an two input OR gate could inserted between comparator 56 and AND gate 58, with the remaining input of the OR gate attached to a signal that was routed to all instances of pixel capture circuit 50. In this alternate embodiment, a logical 0 on the new control signal would allow the digitization process to occur, while a logical 1 on the new control signal would allow conventional reading and writing of N bit DRAM cell 60.

Figure 3:
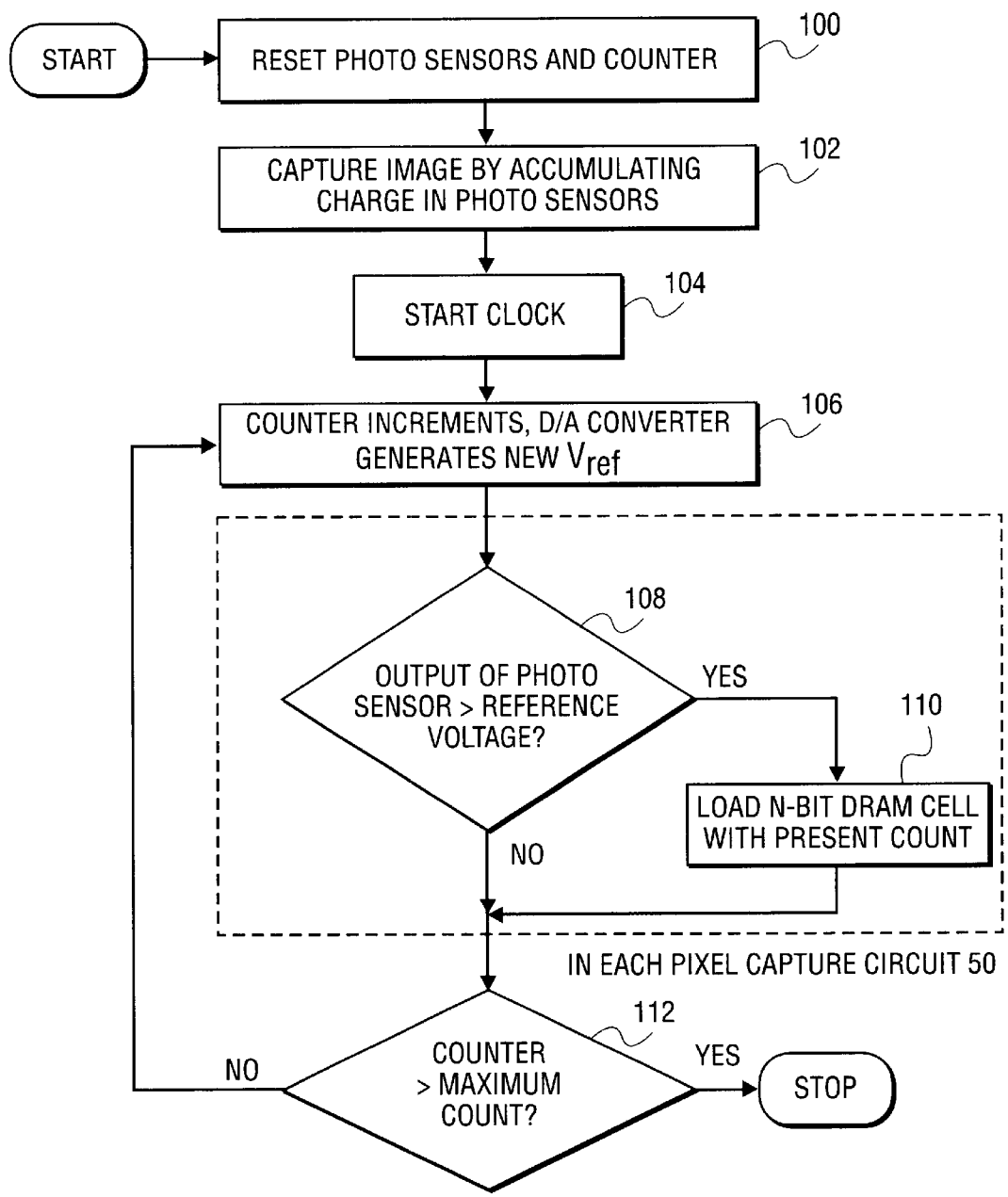
FIG. 3 is a flow diagram describing the operation of the image capture circuit with the pixel capture circuit.

N-bit DRAM cell 60 is used to store the digital representation of the captured photo sensor signal. Specifically, the value stored in N-bit DRAM cell 60 is the digital representation of the magnitude of the light sensed by photo sensor 52. FIG. 3 discusses how this value is determined.

Counter 62 is coupled to the input of N-bit DRAM cell 60 to supply a value to the pixel, as explained below. In a preferred embodiment, counter 62 is a count-up counter which will count up to the maximum value that can be represented in N-bit DRAM cell 60. In an alternate embodiment, counter 62 can be a counter which can count to a value which is either higher or lower than the maximum value that can be represented in N-bit DRAM cell 60. The size of counter 62 and N-bit DRAM cell 60 is dictated by design requirements. In addition, counter 62 can be implemented as a count-down counter, counting down from the highest value that can be represented in N-bit DRAM cell 60. Alternatively, counter 62 counts down from a value which is higher or lower than the value that can be represented in N-bit DRAM cell 60, as the value that can be represented in counter 62 does not have to be matched to the value that can be represented in N-bit DRAM cell 60. If counter 62 is implemented as a count-down counter, and D/A converter 64 outputs a higher voltage for a higher value of counter 62, the inputs to comparator 56 will have to be switched for the invention to function correctly. Alternatively, if counter 62 is a count-down counter but D/A converter 64 outputs a higher voltage for lower values of counter 62, the inputs to comparator 56 do not have to be switched.

Digital-to-analog (D/A) converter 64 is coupled to counter 62 to convert the output of counter 62 to a reference voltage (Vref) signal to which the signal provided by photo sensor 52 is compared. In a preferred embodiment, the characteristics of D/A converter 64 is matched to the characteristics of photo sensor 52 such that each D/A converter 64 and photo sensor 52 will have the same operation parameters to generate consistent signals from the same intensity of light. For example, the range of possible voltages that are produced by D/A converter 64 should be just slightly greater than the voltages that might be found on the output of photo sensor 52. In this preferred embodiment, the output of D/A converter 64 should be positively monotonic with respect to the input; that is, any increase in the value input to A/D converter 64 should produce an increase in the output voltage of D/A converter 64. In an alternate embodiment, D/A converter 64 might be negatively monotonic; that is, any increase in the value input to A/D converter 64 should produce a decrease in the output voltage of D/A converter 64.

Delay circuit 66 is used to add a delay in the loading by N-bit DRAM cell 60 of the output of counter 62 to allow for the output of counter 62 to arrive at a stable state, and for the noise that may be generated by driving the new value into the array to settle out. In one preferred embodiment, delay circuit 66 is a clocked delay circuit using a shift register. In another embodiment, delay circuit 66 is constructed of one or more buffers, each of which adds its intrinsic propagation delay to the signal.

The following pseudo-code illustrates the general operation of image capture circuit 30 and pixel capture circuit 50, where MAX is the largest digital output value for each pixel circuit (for example, if the DRAM cells are 8 bits in size, MAX=255):

```
BEGIN PROGRAM
    Counter = 0;
LOOPTOP:
    V_ref = D/A( Counter );
    for all pixels
        if V_photosensor greater_than V_ref then
            N-bit_DRAM := Counter;
        else
            do nothing;
        end if;
    end for;
    Counter := Counter+1;
    if Counter less_than_or_equal_to MAX then
        go to LOOPTOP;
    end if;
END PROGRAM
```

FIG. 3 is a flow diagram of the operation of pixel capture circuit 50 of FIG. 2 in capturing and digitizing a pixel signal. Although the description of the operation of the circuit is limited to capturing a single pixel signal, the description is applicable to capturing multiple pixel signals using either the circuit in FIG. 2 or multiple copies of the circuit in FIG. 2.

In block 100, pixel capture circuit 50 is reset by draining the charge accumulated in photo sensor 52 to ground through the use of charge dump transistor 54. Charge dump transistor 54 will act as a closed switch when it receives a signal from the RESET signal line. During reset, the count contained in counter 62 is also reduced to zero. D/A converter 64 outputs a value that is equal to or slightly less than the voltage on the capacitor storing the charge in photo sensor 52, and this can be used to cause all the DRAM cells in all instances of image capture circuit 30 to be written to zero when the WordLine is driven. Alternatively, the value in the DRAM cells could be set to zero by writing zeros to them in the manner usually used for DRAMs.

In block 102, photo sensor 52 acquires a charge as it is exposed to the image to be captured. At this point, counter 62 is not being clocked. Conversion of the analog values to digital form does not occur until after the exposure is complete.

The exposure may be terminated by the removal of the light source, or the closing of a mechanical or photoelectric shutter. It is also possible to incorporate an electronic shutter into the photo sensor themselves. In one embodiment, the shutter would take the form of a switching element that stops the flow of charge between the photoelectric device and the capacitor that stores the illumination-determined charge.

When exposure is complete, counter 62 begins to count, and drives the present count onto the bit lines connected to N-bit DRAM cell 60. At the same time, the output of counter 62 is fed to D/A circuit 64 to produce the $V_{ref}$ signal which is sent to comparator 56.

As counter 62 is counting up, each pixel capture circuit such as pixel capture circuit 50 writes incrementing values starting at 0 into the pixel capture circuit respective N-bit DRAM cell, until a number X is reached such that Vref for X is higher than the stored charge. For this X and all subsequent n greater than it, no write to N-bit DRAM cell occurs, so the value in the DRAM cell remains at X-1, the largest value for which $V_{ref}$ was less than or equal to the stored charge's voltage.

In block 108, comparator 56 in every pixel will compare the signals received from D/A circuit 64 and photo sensor 52. If the output of photo sensor 52 is greater than the $V_{ref}$ value as output from D/A circuit 64, then operation will then continue with block 110. Otherwise, operation will then continue with block 112.

In block 110, if the output of photo sensor 52 is greater than the $V_{ref}$ value from D/A circuit 64, comparator 56 will output a logical one value, which will be fed to AND gate 58. The output of AND gate 58 controls the connection of the charge storage cells within N-bit DRAM cell 60 to the bit lines. Since the bit lines are being driven with the value currently being output by counter 62, N-bit DRAM cell 60 will load the value output by counter 62 when AND gate 58 outputs a logical one. Thus, as long as AND gate 58 is receiving a logical one from comparator 56, N-bit DRAM cell 60 will be loaded with the present count of counter 62 every time the WordLine is asserted.

In a preferred embodiment, the WordLine will be asserted at some offset time from transitions in the output of counter 62, to guarantee that the count value output of counter 62 has settled on the bit lines and that the new $V_{ref}$ value, which is the output of D/A circuit 64, has also settled. To provide this offset, delay circuit 66 is used to delay the assertion of the WordLine.

Thus, whenever Vref is less than the voltage output by the photo sensor 52, and the WordLine is asserted, a digital value representing Vref is loaded into the N-bit DRAM cell 60. Since counter 62 counts up and D/A converter 64 is monotonic, Vref is monotonically increasing. Therefor, the last value loaded into N-bit DRAM cell 60 will be value of counter 62 that generated the largest Vref less than or equal to the voltage being output by the photo sensor 52. Since the largest value less than or equal to a value is essentially the value itself, then the last value loaded into any N-bit DRAM cell 60 during the digitization sequence will be essentially the value that represents the voltage being output by the corresponding photo sensor 52, and this is the value that will be available for reading out of N-bit DRAM cell 60 once digitization is complete.

In terms of FIG. 3, this means that within each pixel capture circuit 50, on each iteration, the "YES" branch from block 108 will be taken until the reference voltage exceeds the output of the photo sensor 52, and from that point in time onward the "NO" branch will be taken, until the loop encompassing block 106, 108, 110 and 112 ends.

This accomplishes the A/D conversion as N-bit DRAM cell 60 is loaded with a binary value which is approximately representative of the charge which is stored in photo sensor 52. It is to be noted for all pixels of sensor array 32, each pixel stops loading values into its DRAM cell when appropriate for each pixel's stored charge.

As shown in block 122, counter 62 does not stop counting until counter 62 reaches either the maximum value that can be represented by counter 62, indicating that the digitization of all the image pixels is complete.

To read the value out after conversion, standard DRAM array read techniques are used. Typically, the bit lines of N-bit DRAM cell 60 are set into a neutral state and left un-driven. A word line is then driven to select a set of pixels. These pixels then connect their data storage cells to the bit lines, which causes a change in the state of the bit lines that is detected by sense amps. Note that this is a destructive read operation. However, the device may amplify the data read out from the pixels and drive it back into the storage cells if desired, as is typically done in DRAMs. Also note that the dynamic nature of the DRAM cells requires that they either be read out before the stored charge within them leaks enough to make reading them unreliable, or that the DRAM cells be periodically refreshed to maintain the data stored in each DRAM cell.

In an alternate embodiment, the DRAM cells could be replaced with SRAM cells. SRAM cells do not need to be periodically refreshed and can be read non-destructively. However, SRAM cells require more transistors and are typically larger than DRAM cells.

This invention may allow a high-yield mega-pixel digital image sensor to be produced on a modification of a DRAM process without the need for complex or process-sensitive analog circuitry. A mega-pixel sensor of this design, with 10 bit A/D conversion and two bits for error correction, would have approximately 26 million transistor, and might be equivalent in size to a 32 mega-bit DRAM. A sensor with a resolution that conforms to the standard set by national television standards committee (NTSC) would have approximately 8 million transistors. Note that the image can be stored and processed within the sensor, since it can behave as DRAM if desired. As digitization is performed after image acquisition, this design will work with photographic strobes and other time-varying sources of illumination.

In addition, the invention will facilitate the implementation of "on-sensor" processing of an image. This will allow more functionality to be built into the sensor and require less support circuitry for using a sensor array, configured in accordance with the present invention, in digital imaging applications. For example, image compression circuits can be provided on the image sensor, which would reduce the amount of data that would have to be manipulated after the data is output from the sensor.

Moreover, pixel capture circuit 50 of the present invention allows simple scaling of the resolution of the sensor array as each pixel capture circuit is identical to the next and can be replicated by standard computer-aided manufacturing techniques. If necessary, several image capture circuits such as image capture circuit 30 can be combined on a single circuit to allow for applications where timing and noise considerations do not allow more pixel capture circuits such as pixel capture circuit 50 to be added to image capture circuit 30.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:
   accumulating charge in a plurality of photo sensors in a photo sensor array to arrive at a plurality of photo sensor voltages, wherein each of said plurality of photo sensors are coupled to a memory within said photo sensor array, said memory having a plurality of storage cells;
   incrementing a value in a digital counter external to said photo sensor array and coupled to said memory value that can be represented in said memory;
   generating a reference voltage based on said value in said counter;
   determining whether each of said photo sensor voltages is greater than said reference voltage; and,
   loading said memory for each of said plurality of photo sensors as said value in said digital counter is incrementing with said digital value in said digital counter after delaying to allow said value to stabilize if said photo sensor voltage is greater than said reference voltage, wherein said value in said digital counter represents a digital representation of said photo sensor voltage to be used in a digital imaging device to display said digital representation and said value in said memory is incremented as said value in said digital counter is incrementing.

2. The method of claim 1, wherein if said photo sensor voltage is less than said reference voltage, then preventing said memory from being loaded with said value in said counter.

3. The method of claim 1, further comprising:
   discharging said photo sensor; and,
   resetting said digital counter.

4. The method of claim 1, wherein said reference voltage generation comprises:
   reading said digital counter to provide said value; and,
   performing a digital to analog conversion of said value to arrive at said reference voltage.

5. An apparatus comprising:
   a plurality of photo sensors in a photo sensor array;
   a comparator coupled to each of said plurality of photo sensors;
   a digital-to-analog circuit external to said photo sensor array coupled to said comparator;
   a charge dump switching element coupled to each of said plurality of said plurality of photo sensors, said charge dump switching element to drain and reset a charge in each of said plurality of photo sensors;
   an AND-gate coupled to said comparator;
   a memory having a plurality of storage cells coupled to said AND-gate, a digital counter external to said photo sensor array, and each of said plurality of photo sensors within the photo sensor array, said memory stores a digital representation of an image captured by said plurality of photo sensors to be used in a digital imaging device and said digital representation stored in said memory is incremented as said digital counter is incremented,
   wherein said comparator, said AND gate, and said memory form in-pixel components of an analog-to-digital (A/D) converter.

6. The apparatus of claim 5, further comprising a delay circuit coupled to said AND-gate.

7. The apparatus of claim 6, wherein said delay circuit is configured to receive a clock signal.

8. The apparatus of claim 5, wherein said digital counter is configured to receive a clock signal and a reset signal.

9. An apparatus comprising:
   a sensor array having a plurality of pixel capturing circuits, each of said plurality of pixel capturing circuits having:
     a photo sensor;
     a comparator coupled to said photo sensor and receiving an output from said photo sensor;
     a charge dump switching element coupled to said output of said comparator and receiving an output of said comparator;
     an AND-gate coupled to said comparator and receiving an output of said comparator; and,
     a memory having a plurality of storage cells coupled to said AND-gate and receiving an output of said AND-gate, wherein said memory stores a digital representation of an image captured by said photo sensor to be used in a digital imaging device;
   a digital-to-analog circuit external to said sensor array coupled to said comparator of said sensor array, said comparator receiving an output of said digital-to-analog circuit;
   a digital counter external to said sensor array coupled to said digital-to-analog circuit, said digital-to-analog circuit receiving an output of said digital counter; and,
   a delay circuit external to said sensor array coupled to said AND-gate of said sensor array, said AND-gate receiving an output of said delay circuit, wherein said delay circuit causes a predetermined delay before said memory receives said output of said digital counter to be used for stabilizing said output from said digital counter and said digital representation stored in said memory is incremented as said digital counter is incremented.

10. A method comprising:
    accumulating charge in a plurality of photo sensors in a photo sensor array to arrive at a photo sensor voltage, wherein each of said plurality of photo sensors in said photo sensor array is coupled to a memory within said photo sensor array, each of said memory having a plurality of storage cells;
    decrementing a value in a digital counter external to said photo sensor array, wherein said value has a maximum value that corresponds to a maximum value that can be represented in said memory;
    generating a reference voltage based on said value in said digital counter;
    determining whether said photo sensor voltage is less than said reference voltage; and,
    loading said memory as said value in said digital counter is incrementing with said value in said digital counter after delaying to allow said value to stabilize, wherein said value in said digital counter represents a digital representation of said photo sensor voltage to be used in a digital imaging device to display said digital representation and said value in said memory is incremented as said value in said digital counter is incrementing.

11. The method of claim 10, wherein if said photo sensor voltage is greater than said reference voltage, then preventing said memory from being loaded with said value in said digital counter.

12. The method of claim 10, further comprising:
    discharging said photo sensor; and,
    resetting said digital counter.

13. The method of claim 10, wherein said reference voltage generation comprises:
    reading said digital counter to provide said value; and,
    performing a digital to analog conversion of said value to arrive at said reference voltage.

* * * * *